United States Patent [19]

Naumec et al.

[11] Patent Number: 4,850,734
[45] Date of Patent: Jul. 25, 1989

[54] COUPLING DEVICE FOR A MACHINE TOOL

[75] Inventors: John R. Naumec, Willimantic; Wayne K. Armstrong, Meriden, both of Conn.

[73] Assignee: United Technologies Corporation, Hartford, Conn.

[21] Appl. No.: 289,156

[22] Filed: Dec. 23, 1988

[51] Int. Cl.⁴ .............................................. B25G 3/18
[52] U.S. Cl. ................................... 403/322; 403/325; 403/330
[58] Field of Search ............... 403/330, 325, 328, 334, 403/322; 279/37; 285/320

[56] References Cited

U.S. PATENT DOCUMENTS

| | | | |
|---|---|---|---|
| 2,113,821 | 4/1938 | Baash | 403/334 X |
| 3,093,075 | 6/1963 | Garrett et al. | 403/328 X |
| 3,240,520 | 3/1966 | Dailey et al. | 403/325 |
| 3,599,996 | 8/1971 | Holt | 279/37 X |
| 3,851,562 | 12/1974 | Tomita et al. | 90/11 |
| 4,075,927 | 2/1978 | Frazier | 90/11 |
| 4,204,303 | 5/1980 | Eidam | 29/26 |
| 4,335,500 | 6/1982 | Munekata et al. | 29/568 |
| 4,384,397 | 5/1983 | Nelson | 29/568 |
| 4,663,823 | 5/1987 | McMurtry | 29/568 |
| 4,674,172 | 6/1987 | Botimer | 29/568 |
| 4,706,372 | 11/1987 | Ferrero et al. | 29/568 |

FOREIGN PATENT DOCUMENTS

| | | |
|---|---|---|
| 3341252 | 11/1983 | Fed. Rep. of Germany . |
| 236281A | 4/1986 | Fed. Rep. of Germany . |
| 57-71748 | 4/1982 | Japan . |
| 57-144641 | 7/1982 | Japan . |
| 1342470 | 12/1969 | United Kingdom . |

Primary Examiner—Andrew V. Kundrat

[57] ABSTRACT

A lightweight tool coupling device for coupling a tool shank to a drive spindle is disclosed. A tool coupling housing is rigidly secured to the drive spindle and includes spring biased plungers which cooperate with axial grooves on the tool shank to prevent rotational movement of the shank relative to the drive spindle.

4 Claims, 1 Drawing Sheet

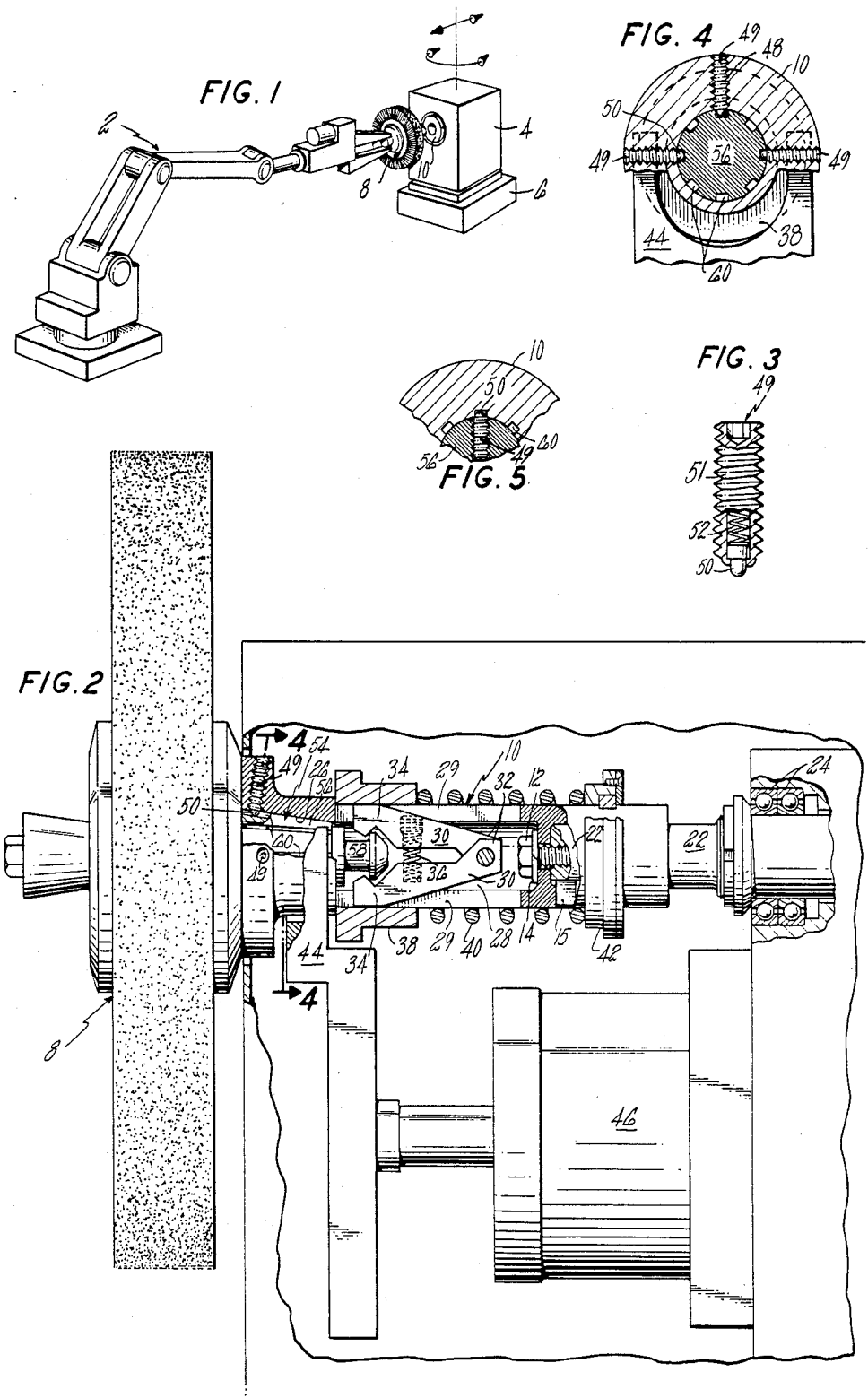

COUPLING DEVICE FOR A MACHINE TOOL

The Government has the rights in this invention pursuant to Contract No. F33657-86-C-0011 awarded by the Department of the Air Force.

TECHNICAL FIELD

The present invention is directed to a coupling apparatus for locking a tool to a drive spindle.

BACKGROUND ART

In a robotic work cell it is highly desirable, from the perspective of accurately and reproducibly positioning the tool and workpiece, to minimize the mass of the mobile components of the system. Conventional massive tooling and drive components are inappropriate in robotic applications.

DISCLOSURE OF INVENTION

The present invention is directed to a low mass apparatus for coupling a tool with a drive spindle. The coupling device comprises a rotatable housing having a tapered bore, a tool shank having a tapered portion for insertion into the tapered bore, means for preventing axial movement of the tool shank relative to the spindle, and means for preventing rotational movement of the tool shank relative to the housing.

In one embodiment, the means for preventing rotational movement of the tool shank relative to the housing comprises an axial slot extending axially along the tapered bore, a recess within the tapered portion of the tool shank, a plunger slideably received within the recess and having a retracted position wherein the plunger is withdrawn within the recess, and an extended position wherein the plunger extends outwardly from the tapered portion of the shank for engagement with the axial slot to prevent rotational movement of the tool shank relative to the housing yet allow axial movement of the tool shank relative to the housing, and means for urging the plunger into the extended position.

In a second embodiment, the means for preventing rotational movement of the tool shank relative to the housing comprise an axial slot extending axially along the tapered portion of the tool shank, a recess communicating with the tapered bore, a plunger slideably received within the recess and having a retracted position wherein the plunger is withdrawn within the recess in the extended position wherein the plunger extends outwardly from the recess for engagement with the axial slot to prevent rotational movement of the tool shank relative to the housing yet allow axial movement of the tool shank relative to the spindle, and means for urging the plunger into the extended position.

The forgoing and other features and advantages of the present invention will become more apparent from the following description and accompanying drawings.

BRIEF DESCRIPTION OF DRAWINGS

FIG. 1 shows a perspective view of an automated work cell including a moveable arm and a moveable buffing pedestal.

FIG. 2 shows a view of the buffing pedestal, partially broken away to show a partially broken away longitudinal cross section of the coupling device of the present invention.

FIG. 3 shows a view of a partially broken away ball plunger ssembly.

FIG. 4 shows an end view along line 4—4 of the coupling device shown in FIG. 2.

FIG. 5 shows an end view of a second embodiment of the coupling device of the present invention.

BEST MODE FOR CARRYING OUT THE INVENTION

FIG. 1 shows a portion of an automated work cell comprising a moveable arm 2 and a moveable buffing pedestal 4. The buffing pedestal 4 may be rotated and moved axially on an indexing Table 6. The moveable arm 2 automatically loads the buffing wheel assembly 8 into the tool coupling housing 10 of the buffing pedestal 4. During the buffing process, the moveable arm holds a workpiece and the arm 2 and buffing wheel assembly 8 are each moved in cooperation under robotic control to buff the surfaces of the workpiece.

FIG. 2 shows a view of the buffing pedestal 2 of FIG. 1 coupled with buffing wheel assembly 8, partially broken away to expose a partially broken away cross-sectional view of the coupling device of the present invention. A rotatable drive spindle 22 is suspended within the pedestal 4 by bearings 24 and driven by a motor (not shown). The tool coupling housing 10 is rigidly secured to the end of the spindle 22 by a bolt 12, a lock washer 14 and a key 15. The tool coupling housing 10 defines a tapered bore 26 and internal cavity 28 which communicates with the tapered bore 26. A pair of opposed slots 29 extend axially along the tool coupling housing 10 and communicate with the internal cavity 28.

A pair of arms 30 are pivotably secured within the internal cavity 28. Each arm 30 has a base end 32 and a notched end 34. A spring 36 disposed between the arms 30 urges the notched ends 34 of the arms 30 outwardly through the opposed slots 29 of the tool coupling housing 10. A slideable locking sleeve 38 surrounds the tool coupling housing 10. A spring 40 mounted between the locking sleeve 38 and a collar 42. A movable yoke 44 extends from a pneumatic actuator 46.

The locking sleeve 38 has a locked position and a retracted position. The locking sleeve 38 is shown in the locked position, in which the sleeve 38 forces the notched ends 34 of the arms 30 together against the resistance of spring 36. The spring 40 urges the locking sleeve 38 into the locked position. In the retracted position the sleeve 38 is retracted toward the collar 42 so that the notched ends 34 of the arms 30 are unrestrained by the sleeve 38 and are forced apart by the spring 36. The pneumatic actuator 46 retracts the yoke 44 so that the yoke 44 engages the locking sleeve 38 and forces the locking sleeve 38 into the retracted position.

Recesses 48 within the tool coupling assembly 10 communicate with the tapered bore 26. A ball plunger assembly 49 is installed within each of the recesses 48.

Referring to FIG. 3, each plunger assembly comprises a ball plunger 50 slideably received within a plunger housing 51 and a spring 52. Each plunger 50 has a retracted position wherein the plunger 50 is withdrawn within the housing 51 and an extended position wherein the plunger 50 extends from the housing 51 and thus protrudes into the tapered bore 26. A spring 52 urges each plunger 50 into the extended position.

Referring again to FIG. 2, tool shank 54 extends from the buffing wheel assembly 8. The tool shank 54 includes a tapered portion 56 and a flanged portion 58. The tapered 56 portion includes axial grooves 60.

With the locking sleeve 38 in the retracted position, the tool shank 54 is inserted into the tool coupling housing 10. The tapered portion 56 of the shank 54 mates with the tapered bore 26 of tool coupling housing 10. The flanged portion 58 of the tool shank extends into the internal cavity 28 of tool coupling housing 10. Once the tool shank 54 is inserted into the tool coupling housing 10, the locking sleeve 38 is moved into the locked position so that the notched ends 34 of the arms 30 grip the flanged portion 58 of the tool shank 54 to prevent axial movement of the shank 54 relative to the tool coupling housing 10 and the drive spindle 22.

FIG. 4 shows an end view across line 4-4 of the coupling device shown in FIG. 2. The tapered portion 56 of the tool shank 54 is shown seated within the bore 26 of the tool coupling housing 10.

The axial grooves 60 on the tapered portion 56 are aligned with the plungers 50, and each of the plungers 50 engages an axial groove 60 to prevent rotation of the tool shank 54 relative to tool coupling housing 10 and the drive spindle 22. The cooperation of the plungers 50 and the axial grooves does not restrict axial movement of the tool shank 54 relative to the tool coupling housing 10.

The tool assembly 8 may be inserted into the bore 26 of the tool coupling housing 10 in any radial orientation. If the tapered portion 56 of the tool shank 54 is in such a position that the axial grooves 60 are not in alignment with the plungers 50, the tapered portion of the shank forces the plungers into the retracted position. Once the tool assembly 8 is inserted in the tool coupling housing 10 and is axially secured by the arms 30, rotational slippage of the tool shank 54 relative to the tool coupling assembly 10 results in alignment of and cooperation of the plungers 50 and axial grooves 60 to prevent further rotational movement of the tool shank 54 relative to the tool coupling assembly 10 and the spindle 22.

The coupling device of the present invention does not require, and preferably does not provide, a locking taper fit between the tapered position 56 of the tool shank 54 and the tapered bore 26, since the cooperation of the plungers 50 and the axial grooves 60 secure the tool shank 54 against rotational movement relative to the tool coupling housing 10. If the tapered portion 56 of the tool shank 54 were received in the tapered bore 26 with a locking taper fit, removal of the tool from the buffing pedestal would require the application of an axially directed force sufficient to break the tapered portion 56 free of the tapered bore 26. The robotic arm 2 may not be capable of generating an axially directed force sufficient to break the tapered portion 56 free of a locking taper fit. Absent a locking taper fit, the robotic arm 2 may easily remove the tool assembly 8 from the tool coupling assembly 10 once the arms 30 disengage the flanged portion 58 of the tool shank 54, since the cooperation of the plungers 50 and axial grooves 60 offer no resistance to axial movement of the tool shank 54 relative to the tool coupling housing 10.

FIG. 5 shows a portion of an end view of an alternative embodiment of the coupling device of the present invention. In the alternative embodiment, the tapered portion 56 of the tool shank 54 includes a recess 48 with a plunger assembly 49 installed within the recess 48 and axial slots 60 extend axially along the tapered bore 26 of the tool coupling assembly 10. The plunger 50 engages an axial slot 60 to prevent rotation of the tool shank 54 relative to tool coupling housing 10 and the drive spindle 22.

The coupling device of the present invention provides a lightweight means for coupling a rotating tool such as a buffing wheel, grinding wheel or cutting wheel with a drive spindle. The low weight of the coupling device of the present invention relative to conventional coupling devices is particularly advantageous in the context of an automated work cell wherein a drive spindle is mounted in a mobile robotically positioned pedestal. Since the coupling device of the present invention does not require a locking taper fit, automatic tool changing may be performed by a robotically controlled arm.

Although this invention has been shown and described with respect to detailed embodiments thereof, it will be understood by those skilled in the art that various changes in form and detail thereof may be made without departing from the spirit and scope of the claimed invention.

We claim:

1. A coupling device for a machine tool, comprising:
    a rotatable housing having a tapered bore,
    a tool shank having a tapered portion for insertion into the tapered bore,
    means for preventing axial movement of the tool shank relative to the housing, and
    means for preventing rotational movement of the tool shank relative to the housing, comprising:
        an axial slot extending axially along the tapered portion of the tool shank,
        a recess within the housing communicating with the tapered bore,
        a plunger slideably received within the recess and having a retracted position wherein the plunger is withdrawn within the recess, and an extended position wherein the plunger extends outwardly from the recess for engagement with the axial slot to prevent rotational movement of the tool shank relative to the housing yet allow axial movement of the tool shank relative to the housing, and
    means for urging the plunger into the extended position.

2. The coupling device of claim 1, wherein the means for preventing axial movement comprises:
    a cavity within the housing, said cavity communicating with the tapered bore,
    a flanged portion extending axially from the tapered portion of the tool shank, and
    a pair of arm pivotably secured within the cavity for gripping the flanged portion.

3. A coupling device for a machine tool, comprising:
    a rotatable housing having a tapered bore,
    a tool shank having a tapered portion for insertion into the tapered bore,
    means for preventing axial movement of the tool shank relative to the housing, and
    means for preventing rotational movement of the tool shank relative to the housing, comprising:
        an axial slot extending axially along and projecting radially from the tapered bore,
        a recess within the tapered portion of the tool shank,
        a plunger slideably received within the recess and having a retracted position wherein the plunger is withdrawn within the recess and an extended position wherein the plunger extends outwardly from the tapered portion of the shank for engagement with the axial slot to prevent rotational movement of the tool shank relative to the housing yet allow axial movement of the tool shank relative to the housing, and means for urging the plunger into the extended position.

4. The coupling device of claim 3, wherein the means for preventing axial movement comprises:

a cavity within the housing, said cavity communicating with the tapered bore, a flanged portion extending axially from the tapered portion of the tool shank, and a pair of arm pivotably secured within the cavity for gripping the flanged portion.

* * * * *